United States Patent [19]
Shimada

[11] Patent Number: 5,258,238
[45] Date of Patent: Nov. 2, 1993

[54] FUSE HOLDER FOR STORAGE BATTERY AND POWER SUPPLY BACK-UP SYSTEM USING THE FUSE HOLDER

[75] Inventor: Shunji Shimada, Kawasaki, Japan
[73] Assignee: Fujitsu Limited, Kanagawa, Japan
[21] Appl. No.: 758,776
[22] Filed: Sep. 12, 1991
[30] Foreign Application Priority Data Sep. 20, 1990 [JP] Japan .............................. 2-98774[U]

[51] Int. Cl.$^5$ ................ H01M 2/00; H01R 13/68; H01R 33/95
[52] U.S. Cl. ........................................ 429/7; 429/61; 429/92; 429/93; 439/621; 439/622
[58] Field of Search ............... 439/621, 622; 429/7, 429/61, 90, 91, 92, 93

[56] References Cited

U.S. PATENT DOCUMENTS

| | | | |
|---|---|---|---|
| 2,876,271 | 3/1959 | Cahoon | 429/7 |
| 4,448,476 | 5/1984 | Perlman et al. | 439/621 |
| 4,508,412 | 4/1985 | Daggett | 439/621 |
| 4,555,451 | 11/1985 | Harrod et al. | 429/61 |
| 4,909,761 | 3/1990 | Muguira | 439/622 |

FOREIGN PATENT DOCUMENTS

| | | | |
|---|---|---|---|
| 1159999 | 7/1969 | United Kingdom | 439/622 |
| 2111329 | 6/1983 | United Kingdom | 439/621 |
| 2156171 | 10/1985 | United Kingdom | 439/621 |

*Primary Examiner*—Wayne Langel
*Attorney, Agent, or Firm*—Welsh & Katz, Ltd.

[57] ABSTRACT

A fuse holder is adapted to be connected to a charge/-discharge line which connects to a storage battery, a charge line for charging the storage battery and a discharge line for discharging the storage battery. The fuse holder includes a holder casing having mutually confronting first and second walls which define a cavity within the holder casing, a first contact provided on the first wall of the holder casing and electrically connected to the charge/discharge line, a second contact provided on the second wall of the holder casing, where the second contact has first and second parts which are mutually isolated and are exposed at a surface confronting the first contact, the first part is electrically connected to the charge line and the second part is electrically connected to the discharge line, and a fuse having a first end connected to the first contact and a second end connected to the second contact. The second end of the fuse makes contact with the first and second parts of the second contact thereby electrically connecting the charge line and the discharge line.

10 Claims, 6 Drawing Sheets

FUSE HOLDER FOR STORAGE BATTERY AND POWER SUPPLY BACK-UP SYSTEM USING THE FUSE HOLDER

BACKGROUND OF THE INVENTION

The present invention generally relates to fuse holders and power supply back-up systems, and more particularly to a fuse holder which is inserted in a power source line of a storage battery and a power supply back-up system using such a fuse holder.

In a point of sales (POS) terminal, a power source of a memory which stores sales data and the like is backed up by a storage battery. In the case of a POS terminal having a memory with a large memory capacity, a large amount of data stored in the memory must be backed up using the storage battery, and in this case, the storage battery used must have a large current capacity and a high output voltage. Particularly in such a case where the storage battery used has the large current capacity and the high output voltage, it is necessary to take measures so as to ensure safety when replacing the storage battery and to prevent a short-circuit accident when mounting the storage battery on the POS terminal. For this reason, a fuse holder is inserted in a power source line of the storage battery.

FIG. 1 shows an example of a conventional fuse holder used in the POS terminal. In FIG. 1, a first contact 12 and a second contact 18 are respectively held on right and left inner walls of a holder casing 20 in a confronting arrangement. A charge/discharge line 10 of a storage battery (not shown) for backing up a memory is connected to the first contact 12. On the other hand, a charge line 14 for memory back-up and a discharge line 16 are connected to the second contact 18. A sealed type fuse 22 is fit between the first and second contacts 12 and 18. Hence, the coupling of the charge/discharge line 10 with the charge line 14 and the discharge line 16 is disconnected by melting the fuse 22.

However, the charge line 14 and the discharge line 16 are coupled in common to the fuse 22 via the second contact 18, and the potentials at the charge line 14 and the discharge line 16 become the same. For this reason, if the fuse 22 is not set between the first and second contacts 12 and 18 or the fuse 22 is melted for some reason, it is impossible to detect this state from the outside during operation of the POS terminal. Because it is impossible to detect whether or not the fuse 22 is melted from outside the holder casing 20, it is necessary to stop the operation of the POS terminal and remove the fuse 22 for testing or inspection in order to positively check the state of the fuse 22. However, such an operation is troublesome to carry out, particularly because of the need to stop the operation of the POS terminal. But when such a troublesome operation is not carried out, there is a problem in that the important data stored in the memory may be lost when a power failure occurs because the fuse 22 may be in an abnormal state, that is, not set in the holding casing 20 or melted.

SUMMARY OF THE INVENTION

Accordingly, it is a general object of the present invention to provide a novel and useful fuse holder and a power supply back-up system in which the problem described above is eliminated.

Another and more specific object of the present invention is to provide a fuse holder adapted to be connected to a charge/discharge line which connects to a storage battery, a charge line for charging the storage battery and a discharge line for discharging the storage battery, comprising a holder casing having mutually confronting first and second walls which define a cavity within the holder casing, a first contact provided on the first wall of the holder casing, the first contact being electrically connected to the charge/discharge line, a second contact provided on the second wall of the holder casing, where the second contact has first and second parts which are mutually isolated and are exposed at a surface confronting the first contact, the first part is electrically connected to the charge line and the second part is electrically connected to the discharge line, and a fuse having a first end connected to the first contact and a second end connected to the second contact, where the second end of the fuse makes contact with the first and second parts of the second contact thereby electrically connecting the charge line and the discharge line. According to the fuse holder of the present invention, it is possible to detect the softened or melted state of the fuse or the non-existence of the fuse from the potential at the discharge line.

Still another object of the present invention is to provide a power supply back-up system comprising supply means for supplying a power source voltage which is derived from an external power source to a charge line, a storage battery for backing up the external power source and for supplying a voltage to a charge/discharge line, a fuse holder connected between the charge line and the charge/discharge line, and alarm output means including a comparator which is coupled to the fuse holder via a discharge line for outputting an alarm when a voltage received via the discharge line falls below a predetermined voltage. The fuse holder comprises a holder casing having mutually confronting first and second walls which define a cavity within the holder casing, a first contact provided on the first wall of the holder casing, where the first contact is electrically connected to the charge/discharge line, a second contact provided on the second wall of the holder casing, where the second contact has first and second parts which are mutually isolated and are exposed at a surface confronting the first contact, the first part is electrically connected to the charge line and the second part is electrically connected to the discharge line, and a fuse having a first end connected to the first contact and a second end connected to the second contact, where the second end of the fuse makes contact with the first and second parts of the second contact thereby electrically connecting the charge line and the discharge line. According to the power supply back-up system of the present invention, it is possible to automatically detect a case where the operator forgets to set the fuse in the holder casing and a case where the fuse is softened or melted, and to automatically warn the operator of such abnormal states. Hence, the operator can set or replace the fuse when such a warning is made, and positively prevent an accident in which the data stored in the memory is lost by a power failure. Furthermore, the abnormal state of the fuse can be detected automatically even during the operation of a POS terminal which includes the alarm output means, and there is no need to stop the operation of the POS terminal in order to make this detection. Therefore, the reliability of the POS terminal is considerably improved compared to the conventional case without the need to make a manual inspection by stopping the operation of the POS terminal.

Other objects and further features of the present invention will be apparent from the following detailed description when read in conjunction with the accompanying drawings.

DESCRIPTION OF THE PREFERRED EMBODIMENTS

Figure 1:
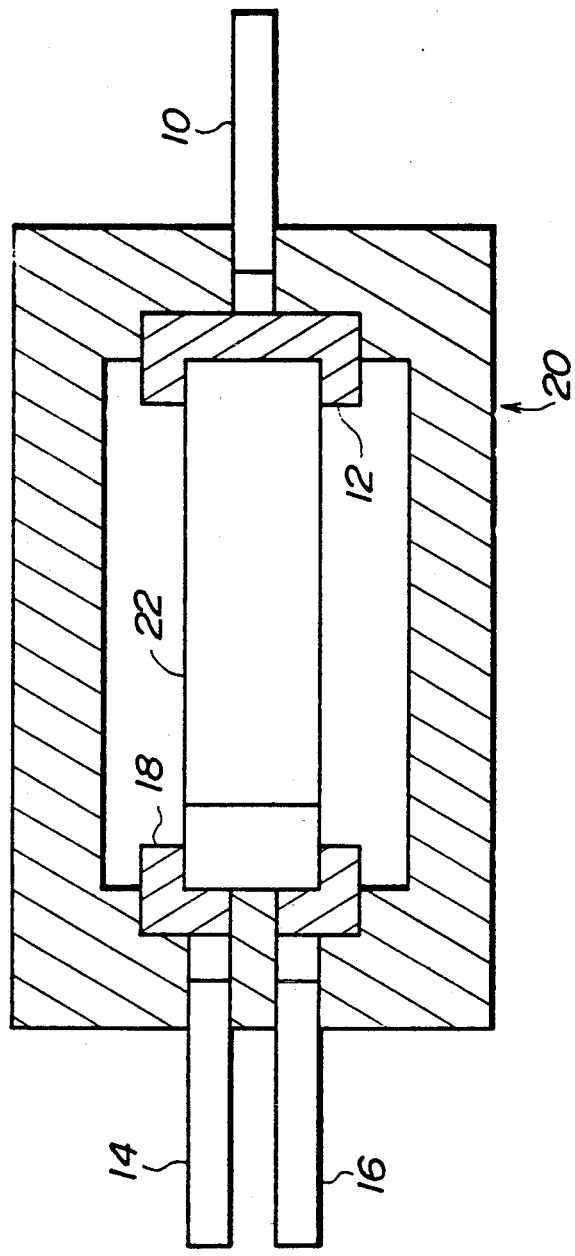
FIG. 1 is a cross sectional view showing an example of a conventional fuse holder.
Figure 2:
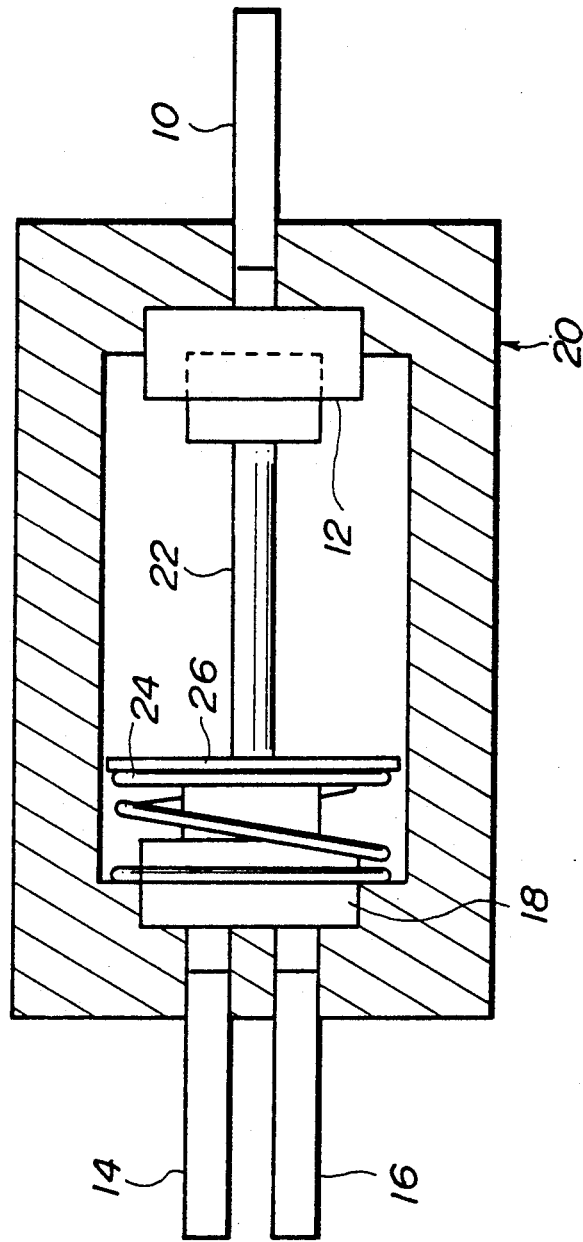
FIG. 2 is a cross sectional view showing an embodiment of a fuse holder according to the present invention.

FIG. 2 shows an embodiment of a fuse holder according to the present invention in a cross section. In the fuse holder FIG. 2 for use in a POS terminal, a first contact 12 is connected to a charge/discharge line 10 of a storage battery which is used for backing up a memory (not shown) of the POS terminal. A second contact 18 is connected to a charge line 14 and a discharge line 16. The first contact 12 is provided on a right inner wall of a holder casing 20 and the second contact 18 is provided on a left inner wall of the holder casing 20, so that the first and second contacts 12 and 18 confront each other in a cavity within the holder casing 20. A fuse 22 is fit between the first and second contacts 12 and 18.

A coil spring 24 is fit around the second contact 18, and a left end of the fuse 22 is inserted into the coil spring 24. A spring receiving part 26 is provided on the left end of the fuse 22, and this spring receiving part 26 is urged rightwardly in FIG. 2 by the force exerted by the coil spring 24. In other words, the coil spring 24 is provided between the left inner wall of the holder casing 20 and the spring receiving part 26 is a compressed state.

Figure 3:
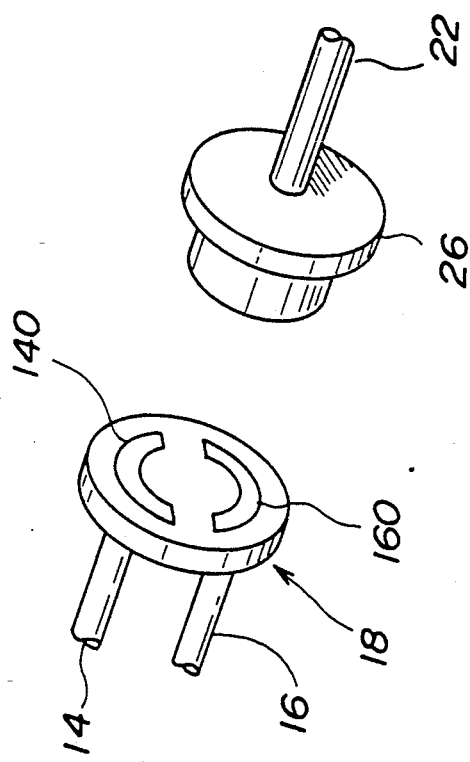
FIG. 3 is a perspective view showing an essential part of the embodiment of the fuse holder shown in FIG. 2.

As shown in FIG. 3, the second contact 18 has a part 140 which connects to the charge line 14 and a part 160 which connects to the discharge line 16. In other words, the parts 140 and 160 which respectively make contact with the charge and discharge lines 14 and 16 are isolated within the second contact 18. The charge and discharge lines 14 and 16 therefore are coupled to the fuse 22 via the respective parts 140 and 160 of the second contact 18, and the charge and discharge lines 14 and 16 are electrically connected only when the left end of the fuse 22 makes contact with the parts 140 and 160 of the second contact 18. In FIG. 3, the illustration of the coil spring 24 is omitted for the sake of convenience.

Figure 4:
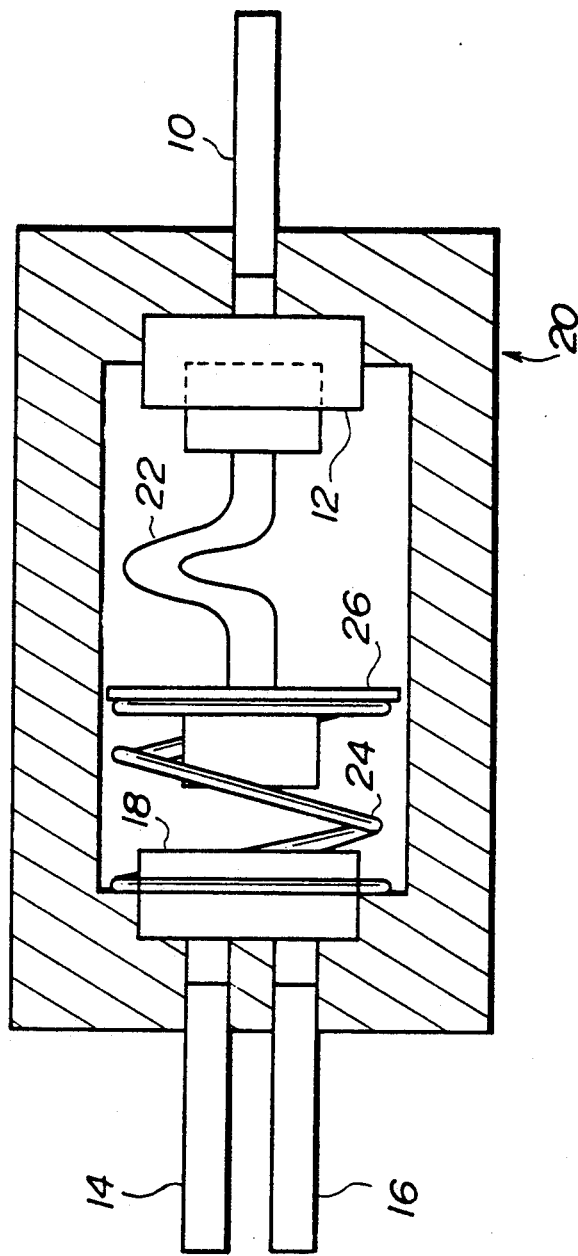
FIG. 4 is a cross sectional view for explaining an operation of the embodiment of the fuse holder.

Hence, as will be described later, the fuse 22 softens or melts when a current flowing through the fuse exceeds a rated current. In this case, the fuse 22 is bent by the force exerted by the coil spring 24 as shown in FIG. 4, and the charge and discharge lines 14 and 16 become electrically disconnected from the charge/discharge line 10.

Figure 5:
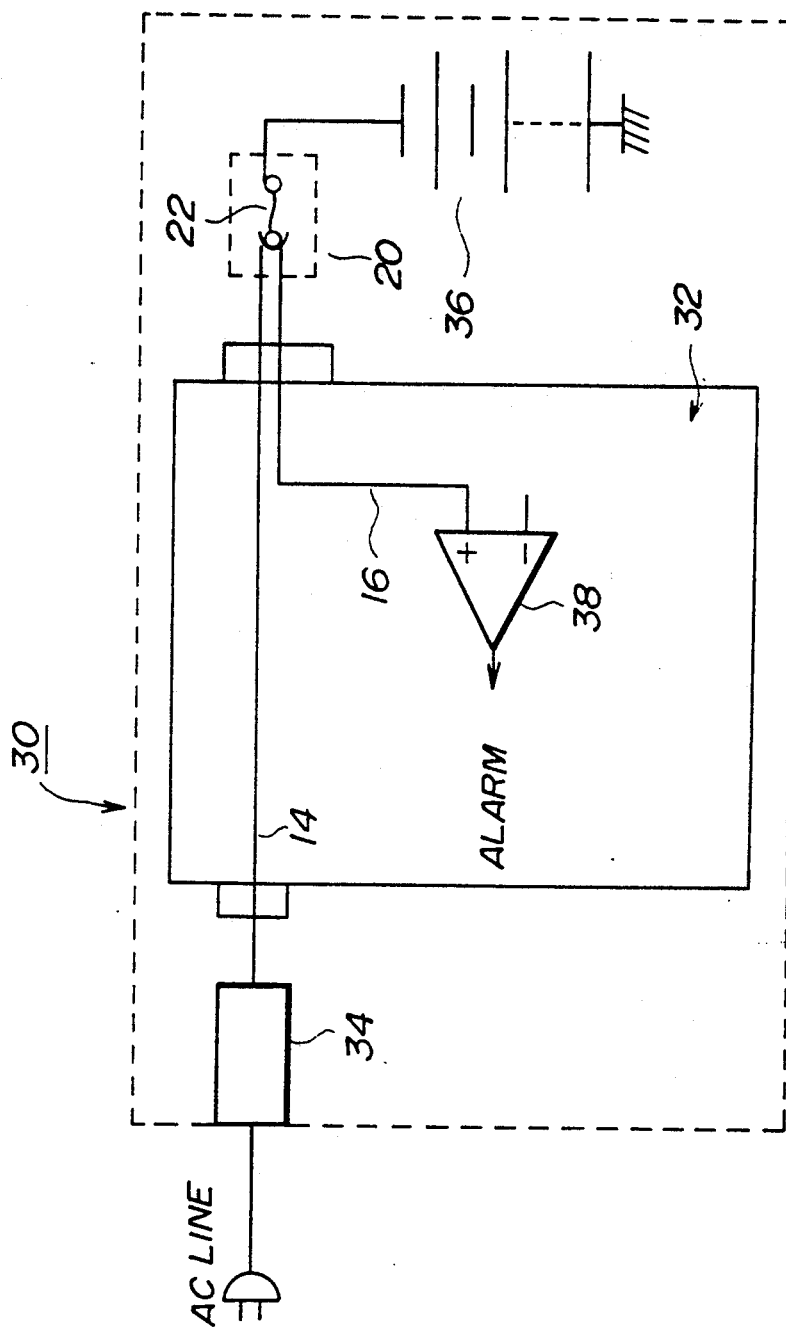
FIG. 5 is a system block diagram generally showing a POS terminal to which the embodiment of the fuse holder may be applied.

FIG. 5 generally shows a POS terminal 30 to which the embodiment of the fuse holder may be applied. The basic structure shown in FIG. 5 is known. A power source voltage is supplied to a control part 32 of the POS terminal 30 from the outside via a power supply unit 34. The holder casing 20 is connected to the charge and discharge lines 14 and 16 from the control part 32 and to a storage battery 36. The control part 32 includes a comparator 38 which is connected to the discharge line 16 and outputs an alarm.

Figure 6:
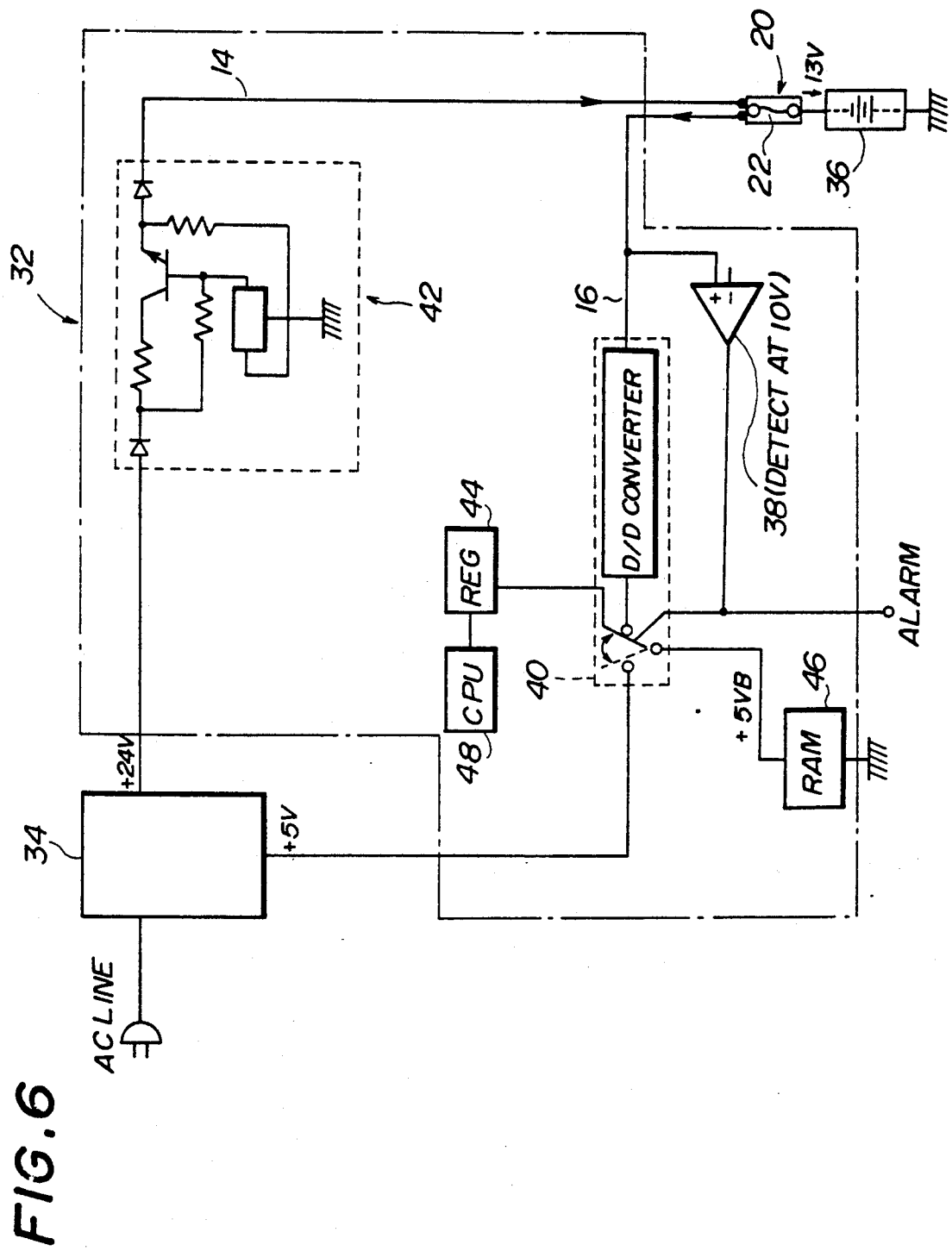
FIG. 6 is a circuit diagram showing a control part of the POS terminal shown in FIG. 5 for explaining an embodiment of a power supply back-up system according to the present invention.

Next, a description will be given of an embodiment of a power supply back-up system according to the present invention, by referring to FIG. 6. This embodiment of the power supply back-up system uses the embodiment of the fuse holder described above. FIG. 6 shows the control part 32 in more detail. A power source voltage of +5 V for control is supplied to a switching circuit 40 from the power supply unit 34. In addition, a power source voltage of +24 V for charging the storage battery 36 is supplied to a charging circuit 42 from the power supply unit 34.

A register 44, a random access memory (RAM) 46 for storing sale data and the like, the comparator 38 and the discharge line 16 are connected to the switching circuit 40. A central processing unit (CPU) 48 is connected to the register 44. On the other hand, the storage battery 36 is coupled to the charging circuit 42 via the holder casing 20 and the charge line 14.

During a normal operation of the POS terminal 32, the power source voltage of +5 V is supplied from the power supply unit 34 to the RAM 46 of the control part 32 via the switching circuit 40.

When a predetermined bit of the register 44 is set from the CPU 48 and the AC supply to the power source board 34 is cut off, the power source voltage of +5 V is supplied from the storage battery 36 to the RAM 46 via the holder casing 20, the discharge line 16 and the switching circuit 40.

When the storage battery 36 dies, the comparator 38 detects this dead state of the storage battery 36 and outputs an alarm. For example, the comparator 38 outputs the alarm when the voltage from the discharge line 16 falls below a predetermined voltage. Hence, the switching circuit 40 is switched in response to the alarm, and the RAM 46 is disconnected from the storage battery 36.

If no fuse 22 is set in the holder casing 20, the discharge line 16 would not be electrically connected to the charge line 14 and the storage battery 36. As a result, the comparator 38 outputs an alarm. For this reason, it is possible to automatically notify the operator of this abnormal state using this alarm which is output from the comparator 38.

Therefore, it is possible to prevent beforehand an accident in which the data stored in the RAM 46 is lost due to no fuse 22 being set in the holder casing 20.

On the other hand, when a current which exceeds a rated current flows through the fuse 22 for some reason during a normal operation of the POS terminal 30, the fuse 22 softens or melts, and the spring receiving part 26 is pushed rightwardly as shown in FIG. 4 due to the force exerted by the coil spring 24. Accordingly, in this case, the left end of the fuse 22 separates from the parts 140 and 160 of the second contact 18, and consequently, the parts 140 and 160 become electrically disconnected. As a result, the charge line 14 and the discharge line 16 become electrically disconnected. In this case, the softened or melted state of the fuse 22 can be detected from an alarm which is output from the comparator 38.

Therefore, it is possible to prevent beforehand an accident in which the data stored in the RAM 46 is lost due to the softened or melted fuse 22 within the holder casing 20.

The alarm which is output from the comparator 38 may be used to turn ON a warning lamp, a warning buzzer and the like. Any warning means may be used to warn the operator, so that the operator may set or replace the fuse 22.

According to this embodiment, it is possible to automatically detect a case where the operator forgets to set the fuse 22 in the holder casing 20 and a case where the fuse 22 is softened or melted, and to automatically warn the operator of such abnormal states. Hence, the operator can set or replace the fuse 22 when such a warning is made, and positively prevent an accident in which the data stored in the RAM 46 is lost by a power failure. Furthermore, the abnormal state of the fuse 22 can be detected automatically even during the operation of the POS terminal 30, and there is no need to stop the operation of the POS terminal 30 in order to make this detection. Therefore, the reliability of the POS terminal 30 is considerably improved compared to the conventional case without the need to make a manual inspection by stopping the operation of the POS terminal 30.

In the described embodiment, the coil spring 24 is provided to ensure electrical disconnection of the charge and discharge lines 14 and 16 when the fuse 22 softens. However, if the rated current is set so that the fuse 22 melts when the current flowing through the fuse 22 exceeds the rated current, it is possible to omit the coil spring 24.

In addition, the means for urging the spring receiving part 26 rightwardly in FIG. 2 is not limited to the coil spring 24, and any suitable spring means may be employed.

Further, the present invention is not limited to these embodiments, but various variations and modifications may be made without departing from the scope of the present invention.

What is claimed is:

1. A fuse holder adapted to be connected to a charge-discharge line which connects to a storage battery, a charge line for charging the storage battery and a discharge line for discharging the storage battery, said fuse holder comprising:
   a holder casing having mutually confronting first and second walls which define a cavity within the holder casing;
   a first contact provided on the first wall of the holder casing, said first contact being electrically connected to the charge/discharge line;
   a second contact provided on the second wall of the holder casing, said second contact having first and second parts which are mutually isolated and are exposed at a surface confronting the first contact, said first part being electrically connected to the charge line, said second part being electrically connected to the discharge line;
   a fuse having a first end connected to the first contact and a second end connected to the second contact, said second end of the fuse making contact with the first and second parts of the second contact thereby electrically connecting the charge line and the discharge line; and
   a spring receiving part which is connected to the second end of the fuse, and spring means for urging the spring receiving part towards the first contact, so that the second end of the fuse separates from the first and second parts of the second contact when a current exceeding a rated current flows through the fuse and the fuse softens.

2. The fuse holder as claimed in claim 1 wherein said spring means includes a coil spring which is provided between the second wall of the holder casing and the spring receiving part in a compressed state.

3. The fuse holder as claimed in claim 2, wherein said coil spring is fit around the second end of the fuse.

4. A power supply back-up system comprising:
   supply means for supplying a power source voltage which is derived from an external power source to a charge line;
   a storage battery for backing up the external power source and for supplying a voltage to a charge/discharge line;
   a fuse holder connected between the charge line and the charge/discharge line; and
   alarm output means including a comparator which is coupled to the fuse holder via a discharge line for outputting an alarm when a voltage received via the discharge line falls below a predetermined voltage,
   said fuse holder comprising:
   a holder casing having mutually confronting first and second walls which define a cavity within the holder casing;
   a first contact provided on the first wall of the holder casing, said first contact being electrically connected to the charge/discharge line;
   a second contact provided on the second wall of the holder casing, said second contact having first and second parts which are mutually isolated and are exposed at a surface confronting the first contact, said first part being electrically connected to the charge line, said second part being electrically connected to the discharge line;
   a fuse having a first end connected to the first contact and a second end connected to the second contact, said second end of the fuse making contact with the first and second parts of the second contact thereby electrically connecting the charge line and the discharge line; and
   a spring receiving part which is connected to the second end of the fuse, and spring means for urging the spring receiving part towards the first contact, so that the second end of the fuse separates from the first and second parts of the second contact when a current exceeding a rated current flows through the fuse and the fuse softens.

5. The power supply back-up system as claimed in claim 4, which further comprises a charging circuit which is coupled to the charge line, said charging circuit charging the storage battery in response to the power source voltage from said supply means.

6. The power supply back-up system as claimed in claim 4, which further comprises switching means having a first input terminal for receiving a voltage from said supply means, a second input terminal which is connected to the discharge line and an output terminal for outputting the voltage received at one of the first and second input terminals in response to a control signal, and a memory which receives the voltage from the output terminal of said switching means, said switching means selectively outputting the voltage received at the first input terminal when the alarm from the alarm output means is received as the control signal.

7. The power supply back-up system as claimed in claim 6, which further comprises means, coupled to said supply means and said switching means, for controlling said switching means to output the voltage received at the second input terminal by generating the control signal when no voltage is received by said supply means from the external power source.

8. The power supply back-up system as claimed in claim 4, wherein said spring means includes a coil spring which is provided between the second wall of the holder casing and the spring receiving part in a compressed state.

9. The power supply back-up system as claimed in claim 8, wherein said coil spring is fit around the second end of the fuse.

10. The power supply back-up system as claimed in claim 4, wherein said alarm output means is provided in a point of sales terminal.

* * * * *